United States Patent [19]

Eriksson

[11] Patent Number: 4,515,192
[45] Date of Patent: May 7, 1985

[54] DEVICE FOR PROCESSING TREES OR THE LIKE

[76] Inventor: Jan Eriksson, Pl 345, S-810 20 Österfärnebo, Sweden

[21] Appl. No.: 503,136
[22] PCT Filed: Oct. 7, 1982
[86] PCT No.: PCT/SE82/00322
    § 371 Date: May 25, 1983
    § 102(e) Date: May 25, 1983
[87] PCT Pub. No.: WO83/01248
    PCT Pub. Date: Apr. 14, 1983

[30] Foreign Application Priority Data

Oct. 7, 1981 [SE] Sweden .............................. 8105907

[51] Int. Cl.³ .................................................. B27L 1/00
[52] U.S. Cl. .................................. 144/2 Z; 144/246 F; 144/343
[58] Field of Search ................. 144/2 Z, 3 D, 335, 336, 144/338, 343, 246 R, 246 F

[56] References Cited

U.S. PATENT DOCUMENTS 4,239,067 12/1980 Monenen ............................. 144/2 Z

FOREIGN PATENT DOCUMENTS

| 468776 | 8/1975 | U.S.S.R. | .......................... 144/2 Z |
| 500161 | 7/1976 | U.S.S.R. | . |
| 563142 | 7/1977 | U.S.S.R. | . |
| 727430 | 4/1980 | U.S.S.R. | .......................... 144/2 Z |

*Primary Examiner*—W. D. Bray
*Attorney, Agent, or Firm*—Diller, Ramik & Wight

[57] ABSTRACT

A device for processing trees or the like comprises two grabbing members pivotable towards and away from each other about hinges and carrying rolls provided to feed trunks at an angle to the pivotal plane of the grabbing members. The hinges are, in a base of the device, arranged movable towards and away from each other without simultaneous pivoting of the grabbing members.

29 Claims, 7 Drawing Figures

DEVICE FOR PROCESSING TREES OR THE LIKE

FIELD OF INVENTION AND PRIOR ART

This invention relates to a device of the kind which comprises at least two grabbing members, which are movable towards and away from each other by a pivoting movement of at least one of the grabbing members, and rolls associated with the grabbing members and adapted to follow the grabbing members during the pivoting movement and be applied against one or more trunks or wood pieces or other elongated objects in the device for feeding thereof at an angle to the pivotal plane of the grabbing members. Although this device may be used in any field of the technique it is especially suitable for forestry.

A device of this kind is previously known by the applicant's own U.S. Pat. No. 4,194,542. Pivotal grabbing members are very desirable to obtain good grabbing ability. To be able to use pivotal grabbing members in the device according to the patent, the rolls have been arranged pivotally movable on the grabbing members about axes extending parallel with although spaced from the pivot axes of the grabbing members. Thereby the rolls in contact with a trunk or the like may pivot relative to the grabbing members while these pivot toward and away from each other. In practice the rolls may while being applied against and propelling a trunk through the device oscillate about a balance position in which they have their axes of rotation essentially parallel. Accordingly, with only two diametrically opposed rolls one can effectivly hold and feed the trunk. Although this known device has more than fulfilled any expectations, it would be desirable to be able to simplify the device by avoiding pivotal mounting of the rolls on the grabbing members while maintaining efficient operation.

BRIEF DESCRIPTION OF THE INVENTION

The object of the invention is to fulfill this desire. The object in question is obtained according to the invention in that said at least one pivotally movable grabbing member and/or the other grabbing member, which itself may be pivotally movable, in another respect than by said already mentioned pivotal mobility is movably arranged to enable, within a range of movement, mutual movement of the grabbing members towards and away from each other without changing the mutual angular relation of the axes of rotation of the rolls in any essential degree. Accordingly, the rolls may be stationarily mounted on the grabbing members and despite this obtain such mutual movement of the grabbing members that the mutual direction of the rolls is maintained and thereby the trunks or the like having variable diameters can be held between the rolls and fed in the device.

It is preferred that both grabbing members are pivotally arranged on a base about hinges and that these hinges are movable toward and away from each other. By locking the grabbing members against pivotal movement, a linear displacement of the grabbing members and the rolls towards and away from each other may be obtained.

BRIEF DESCRIPTION OF DRAWINGS

Referring to the appended drawings, below follows a closer description of diagrammatically illustrated embodiments.

In the drawings.

DETAILED DESCRIPTION OF DIFFERENT EMBODIMENTS OF THE INVENTION

Figure 1:
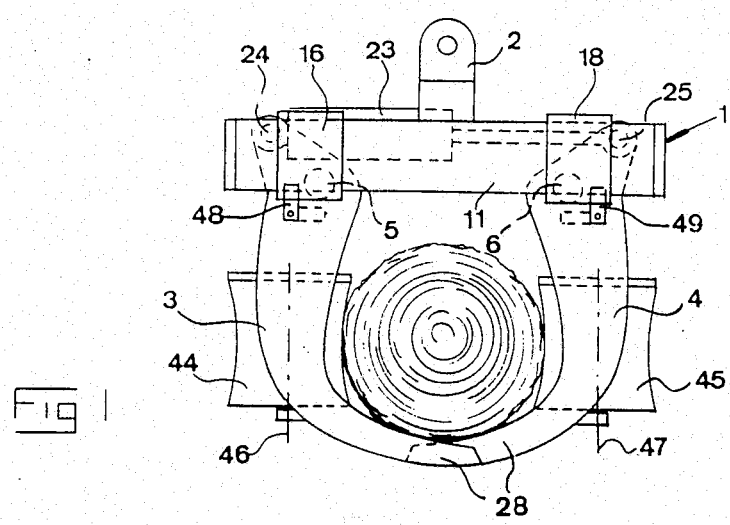
FIG. 1 is an end view of the device according to the invention.
Figure 2:
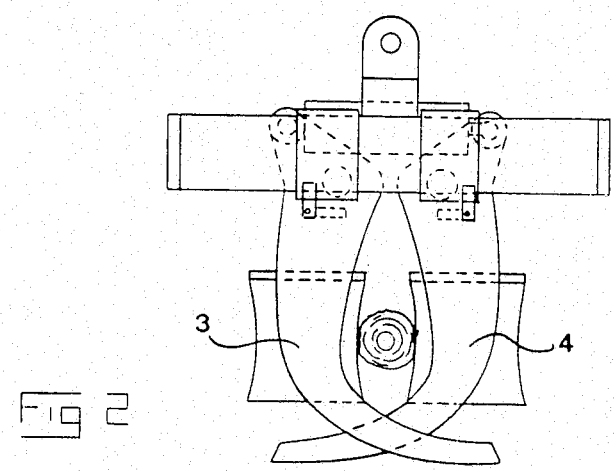
FIG. 2 is a view similar to FIG. 1 but with the grabbing members moved towards each other.
Figure 3:
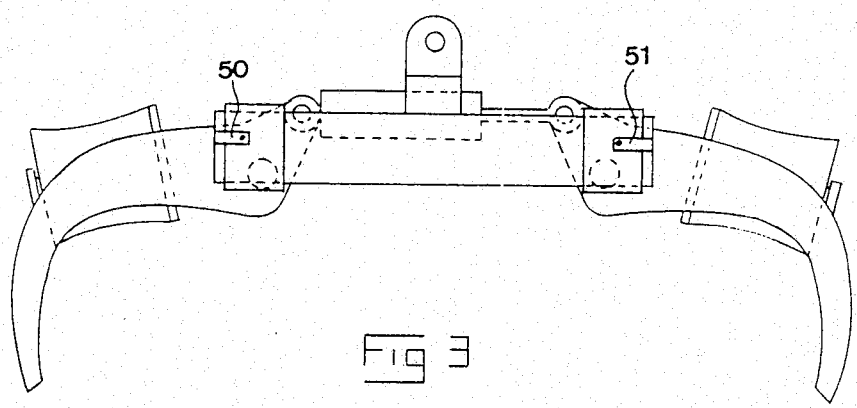
FIG. 3 is a view similar to FIG. 1 but showing the grabbing members moved away from each other.

The device illustrated in FIG. 1–3 comprises a base 1, which is designed to be connected to a crane arm or other arbitrary carrying means which makes it possible to move the device via coupling means 2 arranged on the base in form of ears. Between the device and said crane arm, a rotator may be coupled to make it possible to rotate the device in its entirety about a vertical axis with the base depending downwardly.

The device comprises two grabbing members 3 and 4, which via hinges 5, 6 are pivotally connected to base 1. The hinges 5, 6 form in this case parallel pivot axes. The grabbing members 3, 4 are designed as arms projecting from the body 1 and being by the pivotal design of the members movable towards and away from each other by pivoting about hinges 5, 6.

The hinges 5, 6 are movable towards and away from each other along a guide 11 included in the base in that the hinges 5, 6 are carried by sleeves 16, 18 which displaceably surround portions of the base 1. A power member in the form of a cylinder 23 acts between pivot points 24 and 25 on those sides of the hinges 5, 6 which face away from the grabbing ends 28 of the members. The members 3, 4 carry wheels or rolls 44, 45 which are rotatably arranged about axes 46, 47. The rolls are fixed on the members 3, 4 in such a way that they in principal are not movable relative thereto in other respect than by rotation about the axes 46, 47, which in the illustrated case extend essentially perpendicularly to the axes formed by the hinges 5, 6. The rolls, of which at least one should be driven, may have a concave envelope surface so that trunks in the grabbing device are located with their center at generally the same place in the device independently of the diameter of the trunks as appears by comparing FIG. 1 and 2. As appears from FIG. 1 and 2 the outermost ends of the grabbing members are deflected toward each other so that they when a trunk is held between the rolls form obstacles which do not allow the trunk to pass out of the embrace of the grabbing members in a direction downwardly along axes 46, 47. The device according to FIGS. 1–3 has a locking means which at least includes diagrammatically illustrated locking members 48, 49 arranged to lock together the grabbing members 3, 4 and the sleeves 16, 18 in the positions illustrated with full lines in FIGS. 1 and 2 so that no relative pivoting therebetween about the hinges 5, 6 is possible. However, as soon as the locking members, by means of control means (not illustrated), are moved to the positions indicated in FIGS. 1 and 2 with broken lines, such pivoting about the hinges 5, 6 is permitted. Further, it is preferred that the device includes other locking members 50, 51 which in the position showed in FIG. 3 interlock the sleeves 16, 18 and the base 1.

The grabbing device illustrated in FIGS. 1–3 is designed to be mounted in a crane arm or the like with the grabbing members 3, 4 directed downwardly, the rolls 44, 45 making it possible to feed a trunk in the device in the direction along the hinge axes 5, 6. The device can be used as follows: When used for processing trunks felled previously by other means the grabbing members are located at first in the positions according to FIG. 3. Then, the grabbing device is located, by means of the crane arm, in a suitable position relative to the trunk to be processed whereafter the grabbing members 3, 4 by means of the cylinder 23 are pivoted towards each other, while the sleeves 16, 18 remain locked relative to the base, by locking members 50, 51. When the ends 28 of the grabbing members 3, 4 have picked up the root portion, the locking members 50, 51 are released at the same time as the locking members 48 and 49 are operated to interlock the sleeves 16, 18 and the grabbing members 3, 4 in the relative position according to FIG. 1. Contraction of the cylinder 23 will now bring the grabbing members 3, 4 towards each other without pivoting them relative to each other or the base. At the same time the trunk is brought, by the contact with the ends 28 of the grabbing members, a little upwardly so that the trunk obtains the position according to FIG. 1 in which the rolls 44, 45 stand essentially vertically with the axes of rotation 46, 47 essentially parallel. By means of the cylinder 23 the rolls 44, 45 are now held against the trunk while the rolls may feed the trunk forwardly through the grabbing device. As the diameter of the trunk decreases in the direction towards the top the grabbing members 3, 4 and the rolls 44, 45 are moved towards each other, still without pivotal movmement (see FIG. 2). When the trunk has been fed through the grabbing device the grabbing members 3, 4 are moved in a direction away from each other in desired degree by means of the cylinder 23, for example so that the sleeves 16, 18 reach the positions according to FIG. 3, whereupon the locking members 50, 51 accomplish locking between the sleeves 16, 18 and the base 1 and the locking members 48 and 49 are released to enable pivoting of the grabbing members away from each other.

Figure 4:
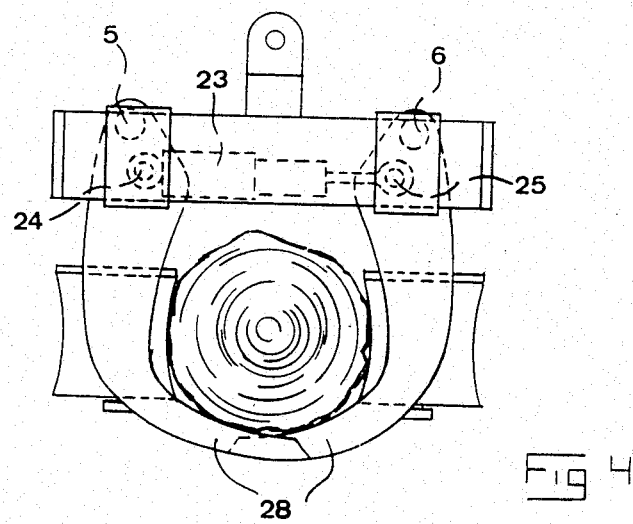
FIG. 4 is a view illustrating a variant of FIG. 1.

The embodiment according to FIG. 4 corresponds in principal to the embodiment according to FIGS. 1-3. The difference is that the connections 24, 25 of the cylinder 23 in this case are located on the same side of the hinges 5, 6 as the ends 28, which necessitates a larger operating range of the cylinder, which therefore in this embodiment is of two stage type.

The embodiment according to FIGS. 1-3 may be provided with members for processing trunks, e.g. pruning and barking members etc. and possibly also a cutting member for cutting trunks in desirable lengths, It is also possible to provide the grabbing device with operating members which make it possible to pivot the device upwardly so that the grabbing members thereof can grab a standing tree, which may be cut with a cutting member arranged on the device. However it should be observed that the grabbing device not at all is limited to use mounted in a crane arm but that it for example can be used with the arms extending upwardly. Use other than within the forestry is anticipated.

Figure 5:
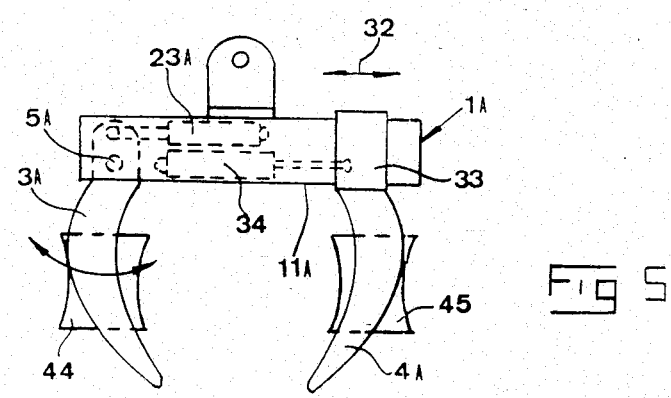
FIGS. 5, 6 and 7 are end views illustrating three different alternative embodiments.

In FIG. 5 the grabbing device is provided with a grabbing member 3A which is pivotally movable in the direction of the arrow relative to base 1 of the grabbing device about a hinge 5A by means of a power member 23A. A second grabbing member 4A is not pivotally movable relative to the base 1A but instead displaceably movable (see the double arrow 32) along a guide 11A included in the base 1A in a direction towards and away from the grabbing member 3A. In practice the grabbing member 4A may be attached to a sleeve member 33, which surrounds a guiding beam portion in the base. The movement, preferably in a straight line, of the member 4A is obtained by means of a particular power member 34. The grabbing members 3A and 4A may be moved towards and away from each other either by pivoting the member 3A about the hinge 5A or displacing the member 4A along the guide 11A or a combination of such pivoting and displacing. On the grabbing members rolls 44, 45 are provided.

Figure 6:
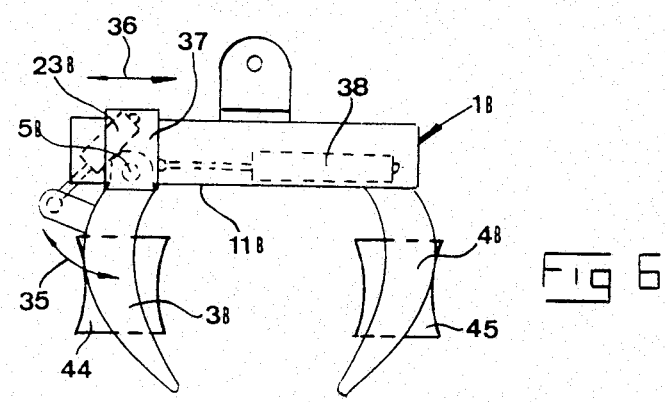

The embodiment illustrated in FIG. 6 differs from the embodiment according to FIG. 5 in that the grabbing member 4B according to FIG. 6 is immovably attached to the base 1B. The other grabbing member 3B is pivotally movable in the direction of the arrow 35 about the hinge 5B, which in its turn is arranged displaceably movable towards and away from the grabbing member 4B in the direction of arrow 36. In practice the hinge 5B of the member 3B may be carried by a sleeve 37, which is displaceably movable back and forth along a guide 11B included in the base 1B. The pivoting of the member 3B is obtained by means of a power means 23B acting between the sleeve 37 and the member while the displacement of the sleeve 37 is accomplished by means of a power member 38 acting between the sleeve and the base 18. A possible modification of the embodiment in FIG. 6 would be to make also the member 4B displaceably movable along the base 1B towards and away from the member 3B in a way similar to the member 4A in FIG. 5. Also here rolls 44, 45 are attached to the grabbing member.

As in the case in FIGS. 1-4 it is important in the embodiments according to FIGS. 5 and 6 that the rolls carrying the grabbing members are movable relative to each other without pivoting since in that case a trunk can be efficiently held by only two rolls located opposite each other. During said non-pivoting movement of the grabbing members with rolls, the axes of rotation of the latter are generally perpendicular to the guide 11A and 11B respectively.

Figure 7:
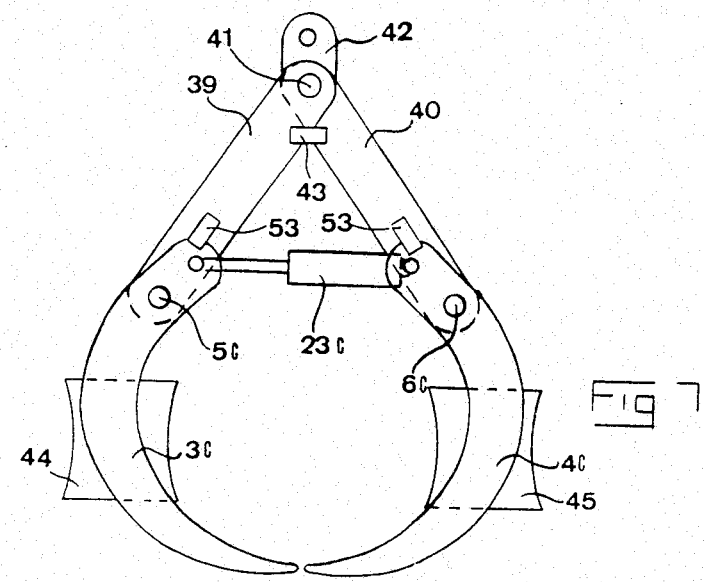

In the embodiment according to FIG. 7 the grabbing members 3C and 4C are pivotally movable towards and away from each other about hinges 5C and 6C by means of a power member 23C acting between the grabbing members. The grabbing members 3C and 4C are via hinges 5C and 6C carried by means of links 39, 40, which form a base of the grabbing device in that said links at 41 are pivotally interconnected and in the area of the pivot 41 provided with coupling means 42 to enable connection of the device to a crane arm or the like. The links 39 and 40 may be interlocked in different relative pivotal positions by means of a locking member diagrammatically indicated at 43. Further locking members 53 are provided to enable interlocking of grabbing members 3C and 4C relative to links 39 and 40, i.e. that no relative pivoting about hinges 5C and 6C is possible when the last-mentioned locking members are in locking position. When locking member 43 is in locking position and locking members 53 in releasing position, the grabbing member 3C and 4C provided with rolls can by expansion and contraction of the cylinder 23C be pivoted towards and away from each other about hinges 5C and 6C. At such pivoting movement the axes of rotation of the rolls will in a proportionately essential degree obtain changed mutual angular relation owing to the short distance to the hinges 5C and 6C respectively.

However, on such pivoting movement one has good grabbing ability. However, when the locking member 43 is released and instead the locking members 53 are operated to a locking position, pivoting of the interlocked arm assemblies 3C, 39 and 4C, 40 respectively about the hinge 41 is obtained when the cylinder 23C is expanded and contracted. Accordingly, the rolls 44, 45 will now be located at an essentially greater distance from the hinge allowing pivoting which causes such pivoting to involve a change of the mutual angular relation of the axes of rotation of the rolls in proportionately unessential degree. In other words, trunks or the like with varying diameter can also in this case be effectively held between the rolls and fed in the device, the adaptation to the variation in diameter occurring by pivoting about hinge 41.

I claim:

1. In a trunk processing device of the type including at least two grabbing members, means mounting at least one of said grabbing members for pivoting movement in a pivoting plane relative to the other of said grabbing members, a plurality of rolls each having an axis, said rolls being relatively movable about their axes with respect to said grabbing members for effecting feeding movement of trunks at an angle to the pivoting plane, the improvement comprising means for adjustably positioning said grabbing members at any one of a plurality of different distances from each other in the absence of essentially any change in the mutual angular relationship of said roll axes relative to each other.

2. The trunk processing device as defined in claim 1 wherein said adjustable positioning means is constructed and arranged for moving said pivoting means and said one grabbing member relative to said other grabbing member.

3. The trunk processing device as defined in claim 1 wherein said adjustable positioning means is operative in the absence of simultaneous pivoting of said at least one grabbing member.

4. The trunk processing device as defined in claim 1 wherein said adjustable positioning means is constructed and arranged for moving said pivoting means and said one grabbing member relative to said other grabbing member in the absence of simultaneous pivoting of said at least one grabbing member.

5. The trunk processing device as defined in claim 1 including a base, means mounting the other of said grabbing member for pivoting movement in a pivoting plane relative to the one grabbing member, and said adjustable positioning means is constructed and arranged to move at least one of said pivot means toward and away from the other of said pivot means.

6. The trunk processing device as defined in claim 1 including a base, said pivoting means mounting only said one grabbing member for pivoting movement relative to said base and the other of said grabbing members is fixed relative to said base.

7. The trunk processing device as defined in claim 1 including a base, said pivoting means mounts only said one grabbing member for pivoting movement relative to said base, and means mounting the other of said grabbing members for sliding movement relative to said base and relative to said one grabbing member.

8. The trunk processing device as defined in claim 1 including a base, means mounting said pivot mounting means for sliding movement relative to said base, and said adjustable positioning means is constructed and arranged to effect sliding movement of said pivot mounting means to thereby effect relative sliding adjustment of said grabbing members between the plurality of different distance thereof.

9. The trunk processing device as defined in claim 1 including a pair of pivotally connected links, said one grabbing member being pivotally connected to one of said links by said pivot mounting means, and the other of said grabbing members being carried by the other of said pair of links.

10. The trunk processing device as defined in claim 1 wherein said adjustable positioning means is constructed and arranged for moving both said one and other grabbing members toward and away from each other.

11. The trunk processing device as defined in claim 1 including first means for locking said one grabbing member to prevent pivoting movement thereof about said pivot mounting means, second means for locking said adjustable positioning means at any one of said plurality of different distances, and said second locking means being constructed and arranged to be unlocked while said first locking means is locked and vice-versa.

12. The trunk processing device as defined in claim 1 including a base, a sleeve reciprocally slidable upon said base, and said pivot mounting means pivotally mount said one grabbing member to said sleeve.

13. A trunk processing device comprising a base, at least two grabbing members adapted to grab a trunk, first means for mounting a first of said grabbing member for sliding movement relative to said base, second means for mounting a second of said grabbing member for sliding movement relative to said base, said sliding movements being selectively reciprocal toward and away from each other, first pivot means for pivotally mounting said first grabbing member to said first slidable mounting means, second pivot means for pivotally mounting said second grabbing member to said second slidable mounting means, and means for selectively reciprocally moving said first and second slidable mounting means toward and away from each other to thereby adjust the distance between said two grabbing members.

14. The trunk processing device as defined in claim 13 including locking means for selectively locking each grabbing member to its associated slidable mounting means to prevent pivoting movement therebetween.

15. The trunk processing device as defined in claim 13 including locking means for selectively locking each slidable mounting means to said base to prevent sliding movement therebetween.

16. The trunk processing device as defined in claim 13 including first locking means for selectively locking each grabbing member to its associated slidable mounting means to prevent pivoting movement therebetween, second locking means for selectively locking each slidable mounting means to said base to prevent sliding movement therebetween, and said first and second locking means being constructed and arranged for alternating locking and unlocking operations whereby said grabbing members are locked to prevent pivoting when said slidable mounting means are unlocked to effect sliding movement and vice-versa.

17. The trunk processing device as defined in claim 13 wherein said reciprocal moving means is connected to and between said two grabbing members.

18. The trunk processing device as defined in claim 13 including at least one roll carried by each grabbing member rotatable about an associated axis, said axes being disposed at a predetermined relationship to each other, and said predetermined roll axes relationship being maintained essentially unchanged at any adjusted distance between said first and second slidable mounting means.

19. The trunk processing device as defined in claim 16 including at least one roll carried by each grabbing member rotatable about an associated axis, said axes being disposed at a predetermined relationship to each other, and said predetermined roll axes relationship being maintained essentially unchanged at any adjusted distance between said first and second slidable mounting means.

20. The trunk processing device as defined in claim 16 wherein said reciprocal moving means is connected to and between said two grabbing members.

21. A trunk processing device comprising a base, at least two grabbing members adapted to grab a trunk, means for mounting a first of said grabbing member for sliding movement relative to said base, means for mounting a second of said grabbing members fixed to said base, said sliding movement being selectively reciprocal movement of said first grabbing member toward and away from said second grabbing member, pivot means for pivotally mounting said first grabbing member to said slidable mounting means, and means for selectively reciprocally moving said slidable mounting means toward and away from said second grabbing member to thereby adjust the distance between said two grabbing members.

22. The trunk processing device as defined in claim 21 including means for effecting pivoting movement of said first grabbing member relative to said slidable mounting means.

23. The trunk processing device as defined in claim 22 including at least one roll carried by each grabbing member rotatable about an associated axis, said axes being disposed at a predetermined relationship to each other, and said predetermined relationship being maintained essentially unchanged at any adjusted distance between said two grabbing members effected by said reciprocally moving means.

24. A trunk processing device comprising a pair of bases, means for mounting said bases for relative movement toward and away from each other, at least two grabbing members adapted to grab a trunk, first pivot means for pivotally mounting a first grabbing member to a first of said bases, second pivot means for pivotally mounting a second grabbing member to a second of said bases, means for selectively moving said bases and/or grabbing arms toward and away from each other to thereby adjust the distance between said two grabbing members, first locking means for selectively locking said bases to each other, second locking means for selectively locking each base to its associated grabbing member, and said first and second locking means being constructed and arranged for alternately locking and unlocking operations whereby said grabbing members are locked to prevent pivoting thereof by said second locking means when said bases are unlocked by said first locking means and vice-versa.

25. The trunk processing device as defined in claim 24 wherein said bases are links, and said first-mentioned mounting means is a pivot.

26. The trunk processing device as defined in claim 24 including at least one roll carried by each grabbing member rotatable about an associated axis, said axis being disposed at a predetermined relationship to each other, and said predetermined relationship being maintained essentially unchanged at any adjusted distance between said two grabbing members effected by said selective moving means.

27. The trunk processing device as defined in claim 25 wherein said selective moving means is connected between said grabbing member.

28. The trunk processing device as defined in claim 25 including at least one roll carried by each grabbing member rotatable about an associated axis, said axis being disposed at a predetermined relationship to each other, and said predetermined relationship being maintained essentially unchanged at any adjusted distance between said two grabbing members effected by said selective moving means.

29. The trunk processing device as defined in claim 27 including at least one roll carried by each grabbing member rotatable about an associated axis, said axis being disposed at a predetermined relationship to each other, and said predetermined relationship being maintained essentially unchanged at any adjusted distance between said two grabbing members effected by said selective moving means.

* * * * *